United States Patent [19]

Cutler et al.

[11] Patent Number: 5,291,581
[45] Date of Patent: Mar. 1, 1994

[54] APPARATUS AND METHOD FOR SYNCHRONIZATION OF ACCESS TO MAIN MEMORY SIGNAL GROUPS IN A MULTIPROCESSOR DATA PROCESSING SYSTEM

[75] Inventors: David N. Cutler, Bellevue; David A. Orbits, Redmond, both of Wash.; Dileep Bhandarkar, Shrewsbury, Mass.; Wayne Cardoza, Merrimack, N.H.; Richard T. Witek, Littleton, Mass.

[73] Assignee: Digital Equipment Corporation, Maynard, Mass.

[21] Appl. No.: 844,968

[22] Filed: Feb. 28, 1992

Related U.S. Application Data

[63] Continuation of Ser. No. 463,002, Jan. 8, 1990, abandoned, which is a continuation of Ser. No. 69,380, Jul. 1, 1987, abandoned.

[51] Int. Cl.$^5$ ............................................. G06F 12/14
[52] U.S. Cl. ............................. 395/425; 364/DIG. 1; 364/228.1; 364/228.3; 364/228.9; 364/228.8; 364/229.1; 364/229.2; 364/246.8
[58] Field of Search ... 364/200 MS File, 900 MS File; 395/400, 425

[56] References Cited

U.S. PATENT DOCUMENTS

| | | | |
|---|---|---|---|
| 3,528,061 | 9/1970 | Zurcher, Jr. | 364/200 |
| 4,000,485 | 12/1976 | Barlow et al. | 364/200 |
| 4,065,809 | 12/1977 | Matsumoto | 364/200 |
| 4,214,304 | 7/1980 | Shimizu et al. | 364/200 |
| 4,247,894 | 1/1981 | Beismann et al. | 364/200 |
| 4,453,214 | 6/1984 | Adcock | 364/200 |
| 4,472,790 | 9/1984 | Burk et al. | 364/900 |
| 4,484,270 | 11/1984 | Quernemoen et al. | 364/200 |
| 4,513,367 | 4/1985 | Chan et al. | 395/425 |
| 4,561,051 | 12/1985 | Rodman et al. | 364/200 |
| 4,574,350 | 3/1986 | Starr | 395/725 |
| 4,587,609 | 5/1986 | Boudreau et al. | 364/200 |
| 4,589,092 | 5/1986 | Matick | 364/900 |
| 4,592,005 | 5/1986 | Kregness | 364/736 |
| 4,648,030 | 3/1987 | Bomba et al. | 364/200 |
| 4,663,709 | 5/1987 | Fujiwara et al. | 395/725 |
| 4,698,753 | 10/1987 | Hubbins et al. | 364/200 |
| 4,768,148 | 8/1988 | Keeley et al. | 364/200 |

FOREIGN PATENT DOCUMENTS

| | | |
|---|---|---|
| 0121700 | 10/1984 | European Pat. Off. . |
| 0130593 | 1/1985 | European Pat. Off. . |
| 0211384 | 2/1987 | European Pat. Off. . |
| 0079133 | 6/1987 | European Pat. Off. . |
| 88/08576 | 4/1988 | World Int. Prop. O. . |

OTHER PUBLICATIONS

Motorola, "MC 68020 32 Bit Microprocessor User's Manual," 1985, pp. 1-7, 8; 6-1, 16; 8-51, 52.
Guttag, K. et al., "Macrostore Firmware Emulation as an Alternative to Co-Processors," Wescon Technical Paper, vol. 26, Sep. 1982, pp. 1-5.

*Primary Examiner*—Joseph L. Dixon
*Assistant Examiner*—Hiep T. Nguyen
*Attorney, Agent, or Firm*—Fish & Richardson

[57] ABSTRACT

In a multiprocessor data processing unit, a data element in the main memory unit, that has system wide significance, can have a requirement that this data element be altered in a controlled manner. Because other data processing units can have access to this data element, the alteration of the data element must be synchronized so the other data processing units are not in the process of altering the same data element simultaneously. The present invention includes an instruction that acquires access to an interlock signal in the main memory unit and initiates an interlock in the main memory unit, thereby excluding other data processing units from gaining access to the interlock signal simultaneously. The instruction causes the data element related to the interlock signal to be transferred to the data processing unit where the data element is saved, can be entered in mask apparatus and then have a quantity added thereto. The altered data element is returned to the main memory unit location and the main memory interlock signal is released, thereby completing the instruction.

24 Claims, 5 Drawing Sheets

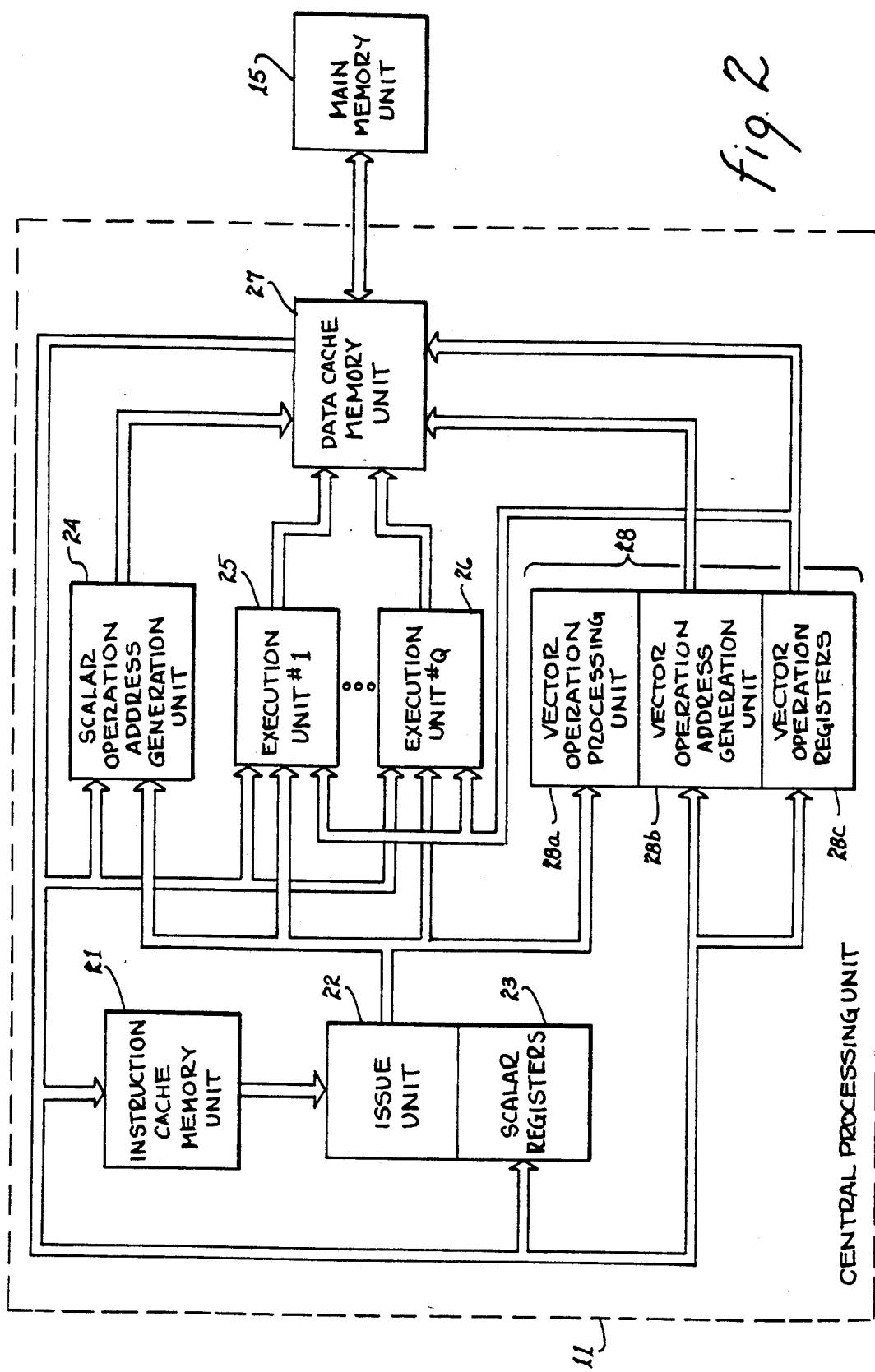

APPARATUS AND METHOD FOR SYNCHRONIZATION OF ACCESS TO MAIN MEMORY SIGNAL GROUPS IN A MULTIPROCESSOR DATA PROCESSING SYSTEM

This is a continuation of application Ser. No. 07/463,002, filed Jan. 8, 1990, now abandoned, which is a continuation of Ser. No. 07/069,380, filed Jul. 1, 1987 now abandoned.

RELATED APPLICATIONS

This application is related to the following U.S. Pat. applications.

APPARATUS AND METHOD FOR PROVIDING AN EXTENDED PROCESSING ENVIRONMENT FOR NONMICROCODED DATA PROCESSING SYSTEMS invented by David N. Cutler, David A. Orbits, Dileep Bhandarkar, Wayne Cardoza and Richard T. Witek; having Ser. No. 07/069,365, filed on Jul. 1, 1987 and assigned to the assignee of the present U.S. Pat. application.

APPARATUS AND METHOD FOR MAIN MEMORY UNIT PROTECTION USING ACCESS AND FAULT LOGIC SIGNALS invented by David N. Cutler, David A. Orbits, Dileep Bhandarkar, Wayne Cardoza and Richard T. Witek; having Ser. No. 07/069,290; filed on Jul. 1, 1987 and assigned to the assignee of the present U.S. Pat. application.

BACKGROUND OF THE INVENTION

1. Field of the Invention

This invention relates generally to data processing systems and, more particularly, to data processing systems in which a plurality of processing units store data elements in a common main memory unit.

2. Description of the Related Art

In data processing systems in which a plurality of data processing units share a main memory unit for storing data required by the processing unit, a control program is implemented to share equitably the resources including the main memory among a multiplicity of users while simultaneously maintaining the integrity of data elements from inadvertent or malicious compromise. The control program can be in simultaneous execution in a plurality of data processing units. Therefore, the control program must synchronize the access to the data elements that are used to control the allocation and protection of resources. A similar problem can be present for users of the data processing system if their programs are executed on several data processing units simultaneously, referred to as parallel processing or multithreading.

A need has therefore been felt for a flexible and efficient technique whereby changes in the data elements stored in main memory can be synchronized, thereby maintaining data integrity.

FEATURES OF THE INVENTION

It is an object of the present invention to provide an improved data processing unit.

It is a feature of the present invention to provide an improved technique for synchronizing changes to data elements in a data processing system.

It is another feature of the present invention to provide for a synchronized updating of a main memory data element with a single instruction.

It is yet another feature of the present invention to provide for saving the data element in the data processing unit before the data element is updated.

SUMMARY OF THE INVENTION

The aforementioned and other features are accomplished, according to the present invention, by providing an instruction, hereinafter called the RMAQI (read, mask, add quadword interlocked) instruction that causes the main memory unit (or a portion thereof) to be interlocked, transfers the addressed data element to the data processing unit, combines the data element with the contents of a mask register, adds the result to the contents of an addend register, and returns the data element to the original main memory location, while saving the original data element in the data processing unit. The functionality of the instruction permits a preselected data element or group of data elements to be placed in the main memory unit and/or permits one or more data elements to be augmented (a value added thereto) in the main memory data in a manner that is synchronized with other data processing units attempting the same operation on the same data in the main memory unit.

These and other features of the present invention will be understood upon reading of the following description along with the drawings.

BRIEF DESCRIPTION OF THE DRAWINGS

FIG. 2 is an example of a central processing unit of a data processing unit capable of using the present invention.

DESCRIPTION OF THE PREFERRED EMBODIMENT

1. Detailed Description of the Figures

Figure 1A:
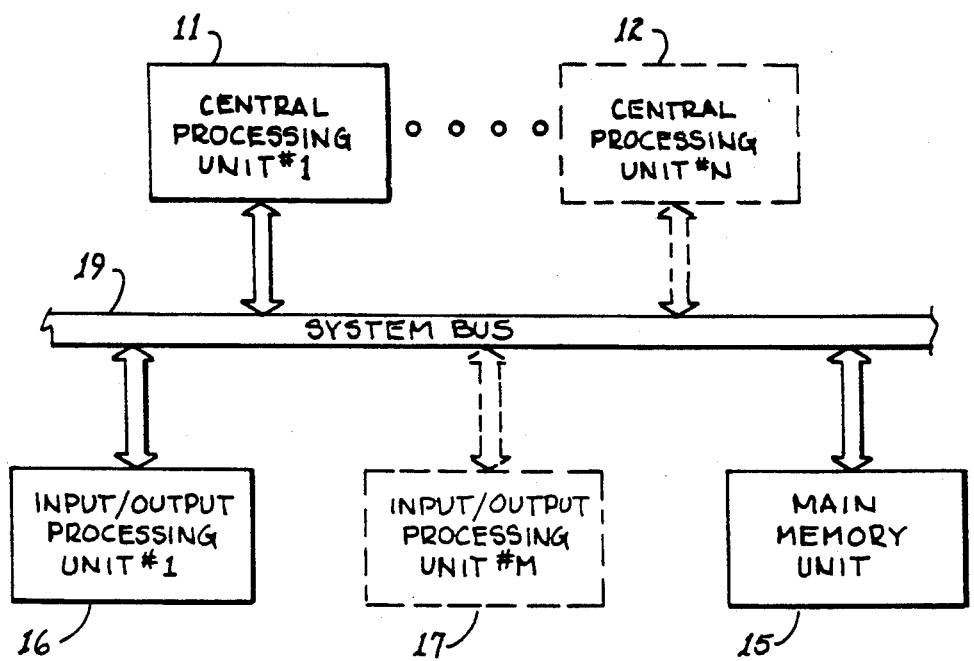
FIG. 1A and FIG. 1B are examples of data processing system implementations capable of using the present invention.
Figure 1B:
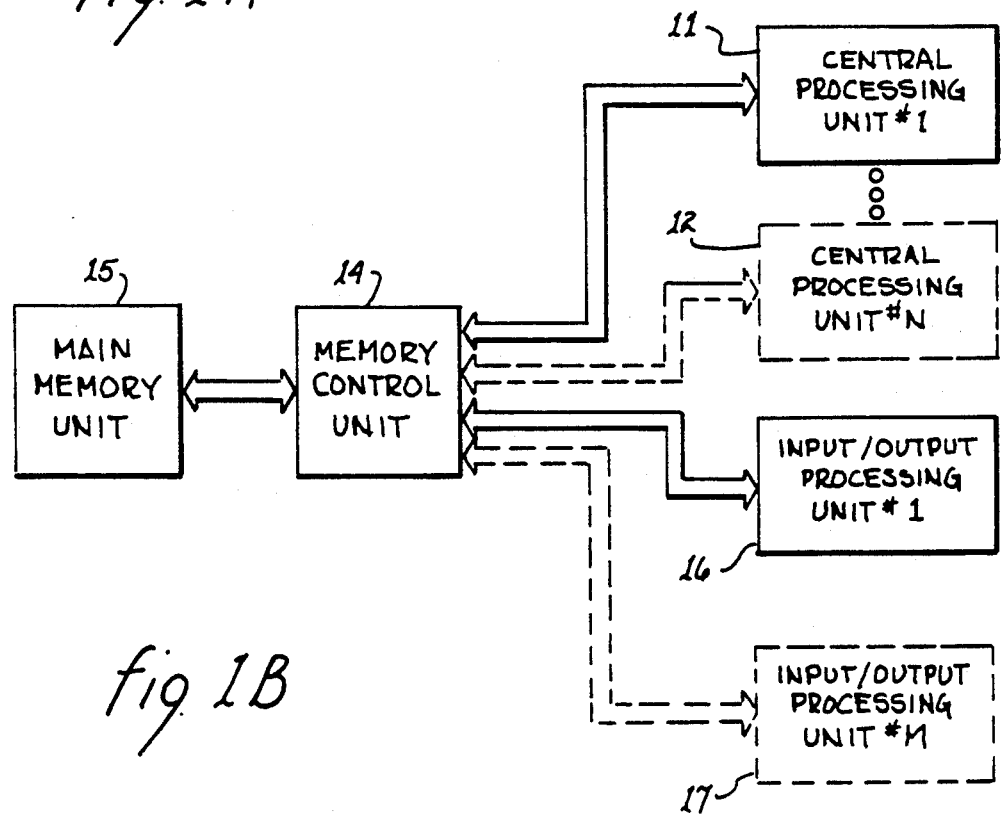

Referring now to FIG. 1A and FIG. 1B, two exemplary data processing system configurations capable of using the present invention are shown. In FIG. 1A, the central processing unit (#1) 11 is coupled to a system bus 19. Other central processing units (e.g., #N) 12 can also be coupled to the system. The central processing unit(s) 11 (through 12) process data according to the structure of the central processing unit(s) in conjunction with central processing unit control programs, the control programs consist of instructions resident in the main memory unit 15. The nonresident data and instructions are typically stored in the mass storage unit(s) and are transferred to and from the main memory unit 15 via the system bus 19. Input/output unit(s) {#1} 16 (through {#M} 17) couple devices such as mass memory storage units, user terminal devices and communication devices to the data processing system by means of the system bus 19. The mass storage units store the data and instructions required by the data processing unit(s). Sets of data and/or instructions, typically designated as pages of data and/or instructions, required for the operation of the central processing units 11 through 12, are transferred from the mass storage units, having relatively slow accessibility, to the main memory unit to which access by the central processing unit is relatively fast. The bus oriented system has an advantage in the relative ease to reconfigure the system but has the disadvantage that the each system component requires control apparatus to provide an interface with the system bus. Referring next to FIG. 1B, a data processing system is shown in which the central processing unit(s) 11 (through 12) and the input/output unit(s) 16 (through 17) are coupled to the main memory unit 15 through a memory control unit 14, the memory control unit 14 replacing the system bus 19 and the control function performed by individual data processing system components in the bus oriented data processing configuration shown in FIG. 1A. The memory control unit 14 provides a centralized control and monitoring of the transfer of data and instructions that can be more efficient than the bus oriented configuration of FIG. 1, but with the loss of flexibility.

Referring next to FIG. 2, a block diagram of an exemplary central processing unit capable of effective utilization of the present invention is illustrated. The issue unit 22 is responsible for providing (decoded) instructions to the plurality of specialized execution units comprising scalar operation address generation unit 24, at least one execution unit (#1) 25 (through execution unit {#Q}26) and a vector operation unit 28, the vector operation unit 28 including vector operation processing unit 28a, vector operation address generation unit 28b and vector operation registers 28c. The data processed by the execution units are typically extracted from the scalar registers 23 or the vector registers 28C. The resulting data from the execution units are stored in the scalar registers 23, in the vector registers 28C or in the data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus.) The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit. The issue unit 22 has the apparatus to attempt to maximize the processing operations of the execution units. Thus, the issue unit 22 includes prefetch apparatus and algorithms to ensure that the appropriate instruction (including any branch instruction) is available to the issue unit 22 as needed. The plurality of execution units are, as indicated by the scalar operation address generation unit 24 and the vector operation unit 28, specialized processing devices for handling certain classes of processing operation. For example, an execution unit can be configured to handle floating point operations, or integer arithmetic operations, etc. The issue unit 22 has associated therewith scalar registers 23 that can store data required for execution of the program or for providing a record of the data processing operation. For example, one register is the Program Counter register that stores the (virtual) address of the next instruction, in the executing program instruction sequence, to be processed. The scalar operation address generation unit 24 is used to convert virtual addresses to physical locations in the main memory unit 15. The issue unit 22 is also responsible for reordering the data from the execution units in the correct sequence when the execution units process instructions at different rates.

The vector operation unit 28 includes a vector operation processing unit 28a, a vector operation address generation unit 28b and vector operation registers 28c. The activity of the vector operation processing unit can control the distribution of the data to the execution units 24 through 26 and the execution of the instructions therein. According to another embodiment (not shown), execution units dedicated to execution of instructions by the vector operation unit 28 can be available in the data processing system. When the execution units are available for both vector and scalar operations, control is subject to the overall system control of the issue unit 22 that allocates the resources of the data processing unit.

Figure 3:
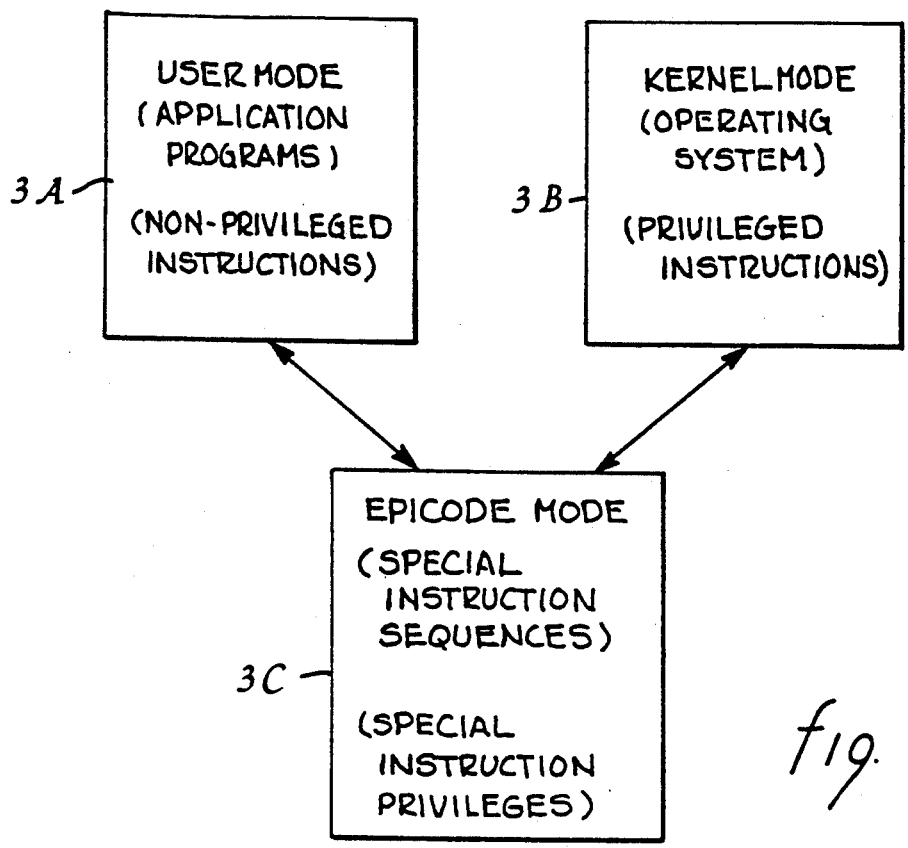
FIG. 3 is a diagrammatic illustration of the relationship of the data processing system operating modes.

Referring next to FIG. 3, the relationship of the two typical operating system modes and the EPICODE mode (Extended Processing Instruction Mode, for executing instruction sequences without interruption) is shown. The user mode 3A typically executes application programs that perform processing functions of immediate interest to the user. The user is provided with relatively complete control in order to obtain the desired processing capabilities, but is limited in such a manner as to preserve system integrity. The user is free to execute any instruction that does not compromise system integrity. These instructions are referred to as nonprivileged instructions. The kernel mode 3B is the mode in which the operating system executes instructions. The instructions associated with the kernel mode 3B are privileged and are not available to user programs because the misuse or malicious use of these instructions could result in program failure or otherwise compromise system integrity. The kernel mode can also execute all of the nonprivileged instructions. Separate from but available to both the user mode 3A and to the kernel mode 3B is the EPICODE mode 3C. This mode of data processing system operation is reserved for instruction sequences that should execute without interruption. This mode is provided with certain privileges and certain dedicated hardware implementing the strategy to ensure noninterruptable (atomic) execution of the appropriate instruction sequences.

Figure 4:
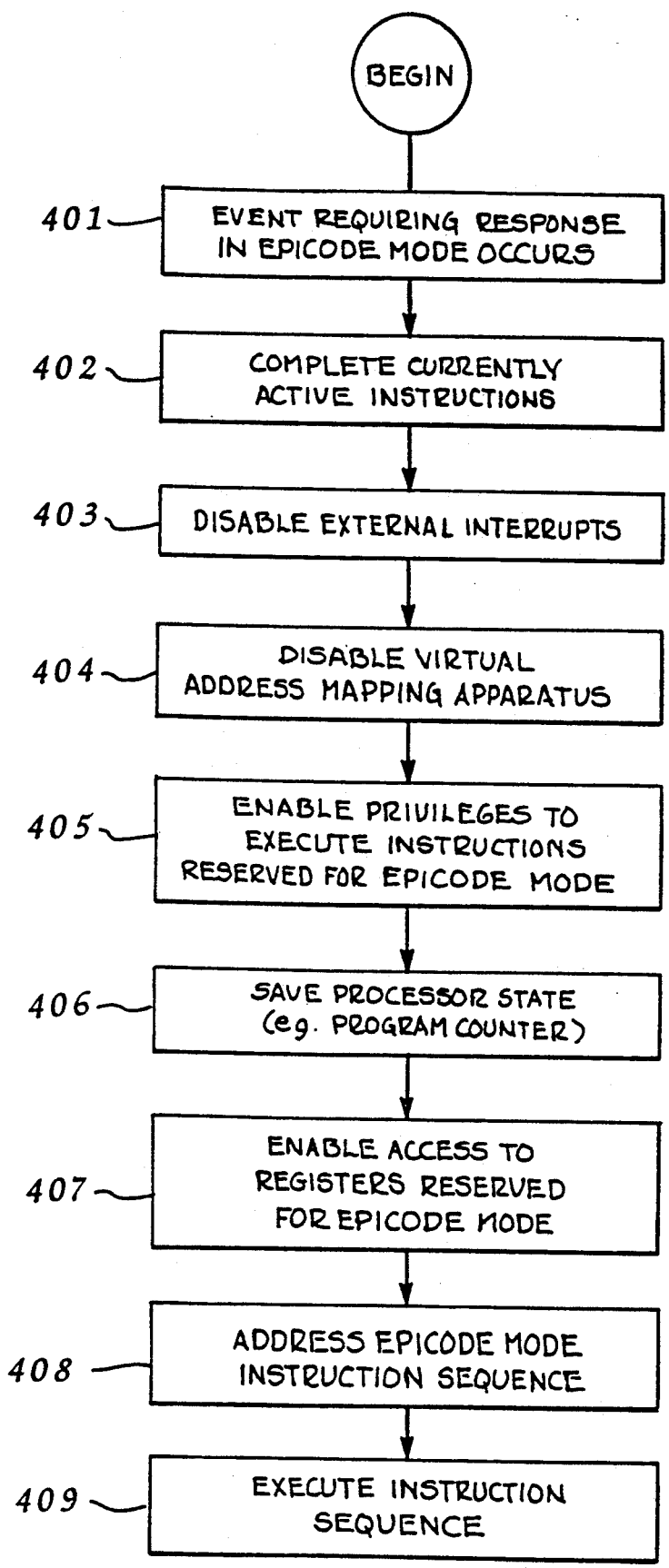
FIG. 4 illustrates the steps in transferring from the user or kernel mode to the EPICODE mode.

Referring next to FIG. 4, the steps for entering the EPICODE mode from either of the operating modes are shown. An event 401, such as an interrupt, a hardware exception or an instruction in the EPICODE format communicates to the data processing system the requirement to enter the EPICODE mode. In step 402, the issue unit is prevented from issuing new instructions, but the instructions for which execution has begun are completed. The completion of currently executing instructions permits all hardware exceptions to be signaled prior to execution in the EPICODE mode. In step 403, the privilege to execute instructions reserved for the EPICODE mode is enabled. In step 404, the external interrupt signals are disabled and the virtual address mapping for instruction stream references is disabled in step 405. In step 406, any processor state that would be destroyed by the execution in the EPICODE mode is saved. For example, the contents of the Program Counter are saved in this step. Access to a special set of registers associated with the EPICODE mode is enabled in step 407. A new Program Counter address is formed by combining an address from a hardware register (called the EPICODE address register) with certain status signal flags in step 408. And in step 409, the sequence of ordinary and EPICODE instructions forming the addressed program are executed.

Figure 5:
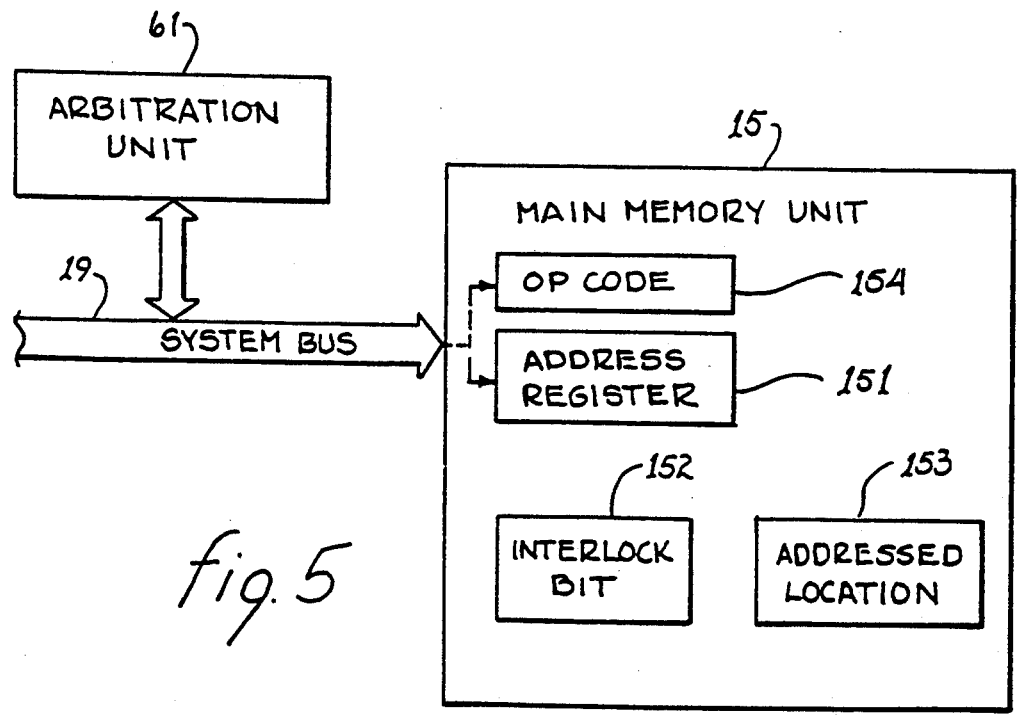
FIG. 5 illustrates the operation of memory interlock mechanism.

Referring to FIG. 5, a technique for providing a main memory unit interlock for a bus oriented system is shown. According to one embodiment, an arbitration unit 61 determines which of the central processing units can gain access to the system bus 19. When a central processing unit gains access to the system bus 19, an operation code, address, and optional data are transferred on the system bus 19 to the main memory unit 15. The main memory unit 15 receives this information and the address is entered in address register 151 and the operation code is entered in register 154. When the operation code entered in register 154 includes an interlock signal (and an interlock signal is not already present), then the main memory unit stores in register 152 an interlock bit and the identification of the data processing unit now having exclusive interlocked access to the main memory unit 15. Thereafter, even when a subsystem gains control of the system bus 19, attempts to access the main memory unit in an interlocked manner will not be completed. When the controlling central processing unit releases the interlock bit, then the other subsystems (central processing units or input/output units) can access the main memory unit in an interlocked manner. The setting of an interlock bit does not preclude other central data or input/output processing units from accessing the data element in the main memory unit in a noninterlocked manner. In some implementations, a plurality of interlock bits related to a subset of addresses in the main memory unit may be utilized. In this manner, only the memory locations associated with the interlock bit are inaccessible for interlocked access permitting the remaining portion of the main memory unit to be available for interlocked data processing operations. In the configuration in which a memory controller unit 14 is present (in FIG. 1B), the arbitration function, queueing function and access control are performed in this unit. In the preferred embodiment, the memory subsystem has four functions, a read (quadword) function, a write (quadword) function, an acquire lock function and a release lock function. In addition, in the preferred embodiment, the interlock does not prevent a read or write of the data, but does not permit another lock at that address by another data processing unit while the interlock is present.

Figure 6:
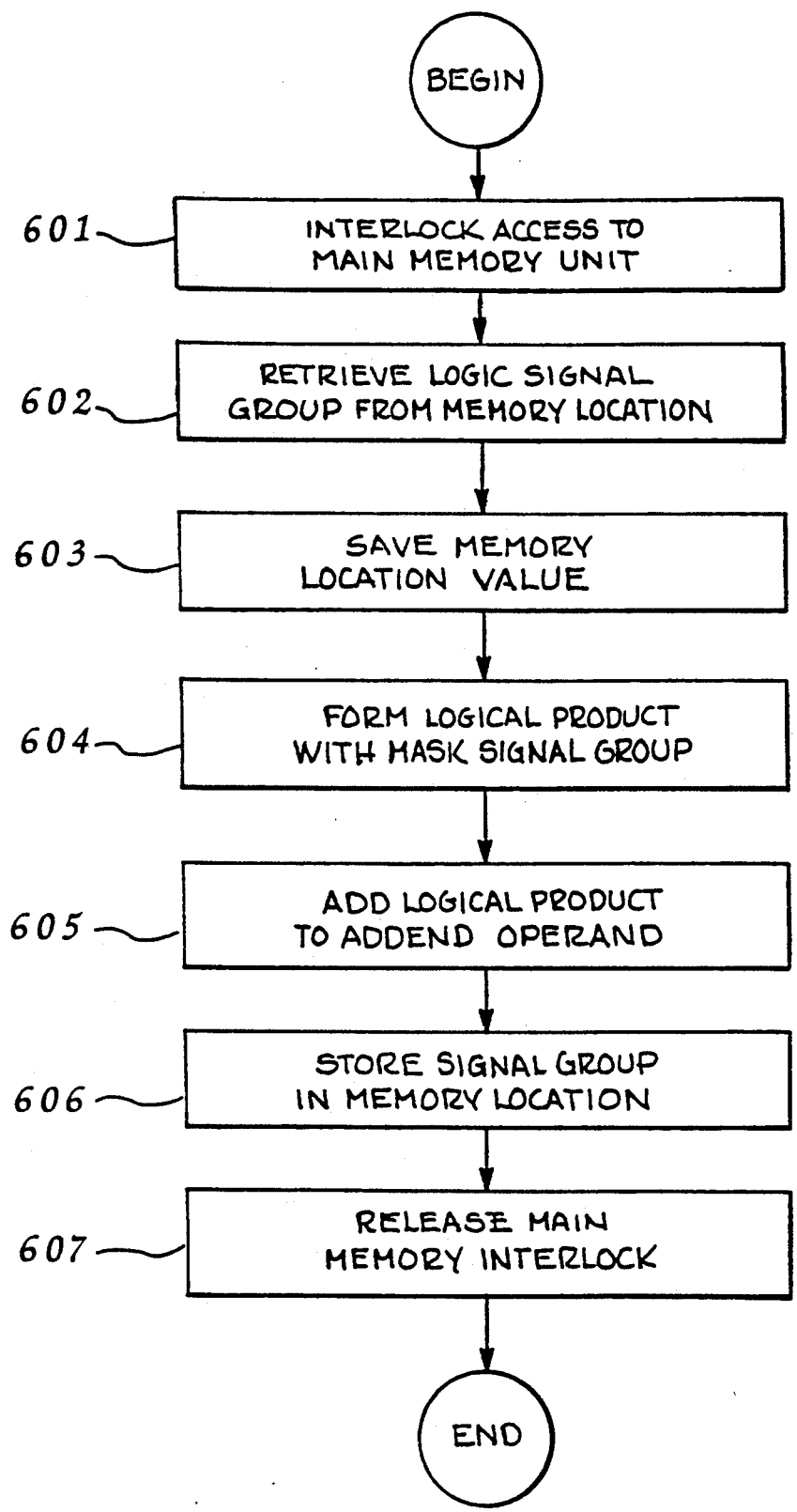
FIG. 6 illustrates the steps in executing the RMAQI instruction according to the present invention.

Referring next to FIG. 6, the steps implementing the RMAQI (read, mask, add quadword interlocked) instruction are illustrated. In step 601, the data processing unit executing the instruction disables interrupt signals, acquires access to the main memory unit and initiates an interlocked access. In step 602, the data element that is the subject of the RMAQI instruction is transferred to the central processing unit and, in step 603, stored in one of the scalar registers 23. The data has a logical AND operation performed thereon with a mask signal group stored in another of scalar register 23 in step 604. In step 605, an operand from yet another scalar register 23 is added to the result of step 604. In step 606, the modified data is returned to the main memory location from which it was originally extracted and the main memory interlock is released and the interrupts enabled in step 607. The original data is still available in the first scalar register referred to in step 603.

2. Operation of the Preferred Embodiment

The central processing unit having pipelined execution units of FIG. 2 was implemented in the preferred embodiment subject to several constraints, however, other design implementations can utilize the present invention. The central processing unit includes a plurality of execution units, each execution unit adapted to execute a class of instructions. By way of example, one execution unit, the scalar address generating unit 24, controls the transfer of the logic signal groups between the central processing unit and the main memory unit, i.e., executes the scalar load/store instructions. One execution unit is adapted to execute data shifting operations, one execution unit for floating point add/subtract operations, one execution unit is adapted for integer and floating point multiply operations and one execution unit is adapted for integer and floating point divide operations. The specialized execution units can be, but are not necessarily implemented in a pipelined configuration. The other features of the central processing unit are the following. The instruction in the currently executing sequence of instructions is transferred to the issue unit 22 from the instruction cache memory unit 21. In the issue unit, the instruction is broken down into its constituent parts and data-dependent control signals and address signals are generated therefrom. However, before an instruction can begin execution (i.e., be issued), several constraints must be satisfied. All source and destination registers for the instruction must be available, i.e., no write operations to a needed register can be outstanding. The register write path must be available at the future cycle in which this instruction will store the processed quantity. The execution unit to be required for processing the instruction during the execution must be available to perform the operation. With respect to the vector operation unit, a vector operation reserves an execution unit for the duration of the vector operation. When a memory load/store instruction experiences a cache memory unit miss, the load/store unit busy flag will cause the subsequent load/store instructions to be delayed until the cache memory miss response is complete. When an instruction does issue, the destination register and the write path cycle for the result are reserved. During operand set-up, all instruction-independent register addresses are generated, operands are read and stored, and data-dependent control signals are generated. The instruction operands and control signals are passed to the associated execution unit for execution. The result generated by the execution unit is stored in the register files or in the data cache memory unit 15 as appropriate. Once an instruction issues, the result of the processing may not be available for several machine cycles. Meanwhile, in the next machine cycle, the next instruction can be decoded and can be issued when the requisite issue conditions are satisfied. Thus, the instructions are decoded and issued in the normal instruction sequence, but the results can be stored in a different order because of the varying instruction execution times of the execution units. This out of order storing complicates the exception handling and the retry of failing instructions. However, these events are relatively rare and the out of order storing provides execution and hardware advantages.

The data processing system described above is typical and can be implemented in a multiplicity of ways. In particular, microcoding techniques are optional in implementing such a structure. When microcoding techniques are not employed, many requisite functions of the data processing system require complex sequencing, but none-the-less must be performed atomically to other activity in the central processing unit. Some examples of such functions include:

1. Interrupt and exception dispatching,
2. Memory management control functions such as translation buffer fill,
3. Instructions that require complex sequencing such as the Return from Exception or Interrupt (REI) instruction,
4. Instructions that require controlled access to processor resources such as instructions that result in memory unit interlock,
5. Instructions that require an architected interface across all implementations for software compatibility, but whose physical implementation may vary widely between implementations. Examples include the Return from Exception and Interrupt and the Move To/From Processor Register.

The present invention implements a mechanism whereby the change of data elements is synchronized for a plurality of programs by an instruction that 1. interlocks access to the memory, 2. reads the logic signal group in the designated memory location (i.e., the address can be either the physical address or the virtual address in the preferred embodiment), 3. saves the value from the designated memory location, 4. forms the logical product (i.e., the AND function) of the data elements from the designated memory location with a mask operand, 5. adds the logical product resulting from the operation to an addend operand, 6. writes the resultant sum back to the designated memory location and 7. releases the interlock. This instruction provides that no other central processing unit or supplementary processor (e.g., an input/output processor) in a multiprocessor system can simultaneously be updating the same memory location by means of another interlock and update instruction. The instruction and apparatus described herein can be used to implement the so-called spin locks, test and set operations, loop iteration induction variable assignment, reference counts on shared objects and other operations requiring multiprocessor synchronization. With the use of an EPICODE mode, or where available, a microcoded implementation, this complex sequence of instructions can be implemented in an atomic fashion. In addition, by executing the instruction in EPICODE mode, additional registers are available and certain events are disabled from interrupting execution of the instruction. It will be clear that although the RMAQI instruction is identified with a quadword data element at the virtual address identified by the instruction signal, data elements of any size can utilize the technique of the present invention. In the preferred embodiment, for example, a RMALI instruction is provided in which the data processed by the instruction is a longword at the virtual address identified by the instruction. In addition, the preferred embodiment includes a RMAQIP instruction, the instruction identifying a physical address. All the instructions are executed in the EPICODE mode.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for modifying data elements in main memory locations of a data processing system having a plurality of central processing units, each of said memory locations being either in a locked condition or an unlocked condition, comprising:

a) means for providing to each one of said central processing units a plurality of instructions for execution, at least one of said instructions being an interlock instruction, each of said plurality of instructions causing the central processing unit that executes said instruction to transfer one of said data elements from one of said main memory locations to said central processing unit, modify said data element, and transfer said modified data element back to said main memory location;

b) interlock means responsive to execution of each one of said instructions by one of said central processing units for: (1) granting said one central processing unit interlock access to one of said main memory locations by placing at least said one main memory location in said locked condition if said executed instruction is an interlock instruction and said one main memory location is in said unlocked condition, (2) denying said one central processing unit access to one of said main memory locations if said executed instruction is an interlock instruction and said one main memory location is in said locked condition, and (3) granting said one central processing unit non-interlock access to said one main memory location without placing said one memory location in said locked condition if said executed instruction is not an interlock instruction;

c) transfer means for transferring said data element from said one main memory location to said one central processing unit that executes said instruction;

d) processing means for performing said modifying of said data element in response to said instruction executed by said one central processing unit;

e) said transfer means transferring said modified data element from said one central processing unit to said one main memory location; and f) if said executed instruction is an interlock instruction, said interlock means placing said one main memory location in said unlocked condition after said transfer of said modified data element to said one main memory location by said central processing unit that executed the interlock instruction.

2. The data element modifying apparatus of claim 1 wherein said one central processing unit is capable of operating in one of a plurality of privileged operating modes and said one central processing unit operates in one of said privileged modes of operation in response to selected instructions executed by one of said central processing units.

3. The data element modifying apparatus of claim 1 wherein a second central processing unit can have noninterlocked access to said main memory location when interlocked access is not permitted.

4. The data element modifying apparatus of claim 1 wherein said at least one interlock instruction identifies a data element in said main memory location, said processing means modifying said data element in response to said interlock instruction.

5. The apparatus of claim 1 wherein said processing means comprises:
   i. first storage means for storing said data element to be modified in said one central processing unit;
   ii. logical means for forming a logical product of said data element and contents of a first register preselected by said one central processing unit to form a combined data element; and
   iii. adding means for forming said modified data element by adding to said combined data element a signal group in a second register preselected by said one central processing unit.

6. A method of modifying a data element in a main memory unit of a data processing system, said main memory unit having locations, said locations being either in a locked condition or an unlocked condition, said data processing system having a plurality of central processing units and said main memory unit, comprising the steps of:
   a) providing to each one of said central processing units a plurality of instructions for execution, at least one of said instructions being an interlock instruction, execution of each of said plurality of instructions causing the central processing unit that executes said instruction to transfer one of said data elements from a location in said main memory unit to said central processing unit, modify said data element, and transfer said modified data element back to said main memory location;
   b) responding to each one of said instructions executed by one of said central processing units by (1) granting said one central processing unit interlock access to said main memory location by placing said main memory location in said locked condition if said executed instruction is an interlock instruction and said main memory location is in said unlocked condition, (2) denying said one central processing unit access to said main memory location if said executed instruction is an interlock instruction and said main memory location is in said locked condition, (3) granting said one central processing unit non-interlocked access to said main memory location without placing said one memory location in said locked condition if said executed instruction is not an interlock instruction, and (4) causing said data element to be transferred from said main memory location to said one central processing unit to be modified if said one central processing unit has been granted access to said main memory location; said one central processing unit further responding to said executed instruction by transferring said modified data element from said one central processing unit to said main memory location, and, if said executed instruction is an interlock instruction, placing said main memory location in said unlocked condition; and
   c) executing said instruction by said one central processing unit without interruption from another of said central processing units.

7. The method of claim 6, said data processing system being capable of operating in one of a plurality of operating modes, comprising the step of providing said data processing system with a mode of operation wherein said one central processing unit can execute said instruction without interruption from another of said central processing units.

8. The method of claim 7 wherein execution of said modifying step by said one central processing unit further includes the steps of:
   forming a logical product of said data element and contents of a mask register to form an intermediate data element; and
   adding an operand from a register selected from said main memory location by said one central processing unit in response to said executed instruction to said intermediate data element.

9. The method of claim 8 wherein said at least one interlock instruction comprises constituent instructions and further comprising the step of sorting said constituent instructions of said interlock instruction in reserved main memory locations.

10. The method of claim 6 wherein the modification of said data element includes:
   storing said data element in said one central processing unit;
   forming a logical product of said data element and contents of a first register preselected by said one central processing unit to form a combined data element; and
   adding a data signal group from a second register preselected by said one central processing unit to said combined data element to form said modified data element.

11. A data processing system including a main memory unit and a plurality of data processing units comprising:
   a) means for providing to each one of said data processing units a plurality of sequences of instructions stored in predetermined locations in said main memory unit for execution; and
   b) control means for executing one of said instruction sequences in response to a modify instruction from one of said data processing units without interruption from another of said data processing units,
   wherein, (1) if said modify instruction is an interlock instruction and said main memory unit is not interlocked, said one data processing unit:
   interlocks said main memory unit and prevents another one of said data processing units from interlocking said main memory unit,
   modifies a data element in said main memory unit, and
   releases said main memory unit interlock;
   (2) if said modify instruction is an interlock instruction and said main memory unit is interlocked, said one data processing is denied access to said main memory; and
   (3) if said modify instruction is not an interlock instruction, said one data processing unit modifies a data element in said main memory unit without interlocking said main memory unit.

12. The apparatus of claim 10 wherein, if said modify instruction is an interlock instruction, said data processor modifies said data element by logically combining said data element with a mask signal stored in a register of said one data processing unit.

13. The data processing system of claim 11 wherein said data processing unit executes said instruction sequences in a mode of operation different from a user mode and a kernel mode.

14. The data processing system of claim 13 wherein said data processing unit disables interrupt signals from others of said data processing units when said data processing unit is in said mode.

15. The data processing system of claim 13 wherein said data element is stored in a central processing unit executing said one sequence of instructions after said data element has been modified.

16. A data processing system comprising a plurality of central processing units and main memory units, each one of said central processing unit having:
   a) register means connected to each of said central processing units for receiving data elements from one of said main memory units and for storing said data elements therein;
   b) transfer means connected to each of said central processing units for transferring a data element between one of said main memory units and said register means of one of said central processing units;
   c) combining means for logically combining said transferred data element stored in said register means with a mask signal group stored in a second register means of said one central processing unit to form a modified data element;
   d) interlock means associated with each of said main memory units for controlling interlock access to at least one data element; and
   e) execution means for executing an instruction included in a plurality of instructions provided for each of said central processing units and that includes an interlock instruction and a second instruction, said one central processing unit selecting between said interlock instruction and said second instruction,
   execution of said interlock instruction: causing said interlock means to grant said one central processing unit interlock access to said data element and prevent interlock access to said data element by another of said central processing units when no other of said central processing units has interlock access to said data element and causing said interlock means to deny said one central processing unit interlock access to said data element when another of said central processing units has interlock access to said data element; and, when said one central processing unit has been granted interlock access, (1) causing said transfer means to transfer said data element to said register means of said one central processing unit, (2) causing said combining means to provide a modified data element, (3) causing said modified data element to replace said data element in said main memory unit, and (4) causing said interlock means to permit interlocked access to said modified data element when said modified data element has replaced said data element in said main memory unit;
   execution of said second instruction: causing said interlock means to grant said one central processing unit noninterlock access to said data element, causing said transfer means to transfer said data element to said register means of said one central processing unit, causing said combining means to provide a modified data element, and causing said modified data element to replace said data element in said main memory unit.

17. The data processing system of claim 16 wherein said one central processing unit executes said selected instruction without interruption from another of said central processing units.

18. The data processing unit of claim 17 wherein said identified data element remains stored in said register means of said one central processing unit after said modified identified data element has been stored in said main memory unit.

19. The data processing system of claim 18 wherein said identified data element in said register means of said central processing unit can be accessed by another of said central processing units in a noninterlocked fashion.

20. The data processing system of claim 17 wherein each of said central processing units executes a set of instructions, said set including a group of privileged instructions and a group of nonprivileged instructions, and each of said central processing units having a first mode of operation for executing said nonprivileged instructions, a second mode of operation for executing said privileged and said nonprivileged instructions, and a third mode of operation for executing predefined sequences of instructions implementing predefined said privileged and said nonprivileged instructions, said interlock instruction being a predefined instruction.

21. The data processing unit of claim 20 wherein said central processing unit enters said third mode of operation in response to a mode signal after said central processing unit completes currently executing instructions and disables interrupt signals from other of said central processing units.

22. The data processing system of claim 16 wherein said combining means includes apparatus for adding said identified data element to an operand stored in said register means.

23. The data processing system of claim 17 wherein
   said selected instruction identifies at least one mask signal in said mask signal group from a register selected from said main memory unit by said central processing unit in response to said selected instruction, and
   said selected instruction further identifies an operand signal group from a register selected from said main memory unit by said central processing unit in response to said selected instruction,
   said combining means logically combining said identified mask signal with said identified data element and adding identified said operand signal group to said identified data element.

24. The data processing system of claim 16 wherein said identified data element is used to synchronize said central processing units.

* * * * *